US009612412B2

(12) United States Patent
White

(10) Patent No.: US 9,612,412 B2
(45) Date of Patent: Apr. 4, 2017

(54) OPTICAL DEVICE FOR BEAM COMBINING AND/OR ROUTING AND METHOD

(71) Applicant: U.S. Army Research Laboratory, Adelphi, MD (US)

(72) Inventor: Jeffrey Owen White, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 765 days.

(21) Appl. No.: 14/068,420

(22) Filed: Oct. 31, 2013

(65) Prior Publication Data

US 2016/0223766 A1   Aug. 4, 2016

(51) Int. Cl.
| | |
|---|---|
| G02B 6/42 | (2006.01) |
| G02B 27/14 | (2006.01) |
| H01S 3/10 | (2006.01) |
| G02B 6/35 | (2006.01) |
| H01S 3/23 | (2006.01) |
| H01S 3/00 | (2006.01) |
| H01S 3/13 | (2006.01) |

(52) U.S. Cl.
CPC ......... *G02B 6/4286* (2013.01); *G02B 6/3588* (2013.01); *G02B 27/14* (2013.01); *H01S 3/0071* (2013.01); *H01S 3/10038* (2013.01); *H01S 3/1307* (2013.01); *H01S 3/2383* (2013.01); *H01S 3/1305* (2013.01)

(58) Field of Classification Search
CPC .... G02B 27/14; G02B 27/141; G02B 27/144; G02B 27/4286; G02B 27/3588; H01S 3/10038
See application file for complete search history.

(56) References Cited

U.S. PATENT DOCUMENTS

| 7,336,363 B2 * | 2/2008 | Rothenberg ....... B23K 26/0613 |
| | | 356/450 |
| 7,502,395 B2 * | 3/2009 | Cheng .................. H01S 3/2383 |
| | | 356/477 |

(Continued)

OTHER PUBLICATIONS

T.Y. Fan, "Laser beam combining for high-power, high-radiance sources," IEEE Journal of Selected Topics in Quantum Electronics, vol. 11, No. 3, pp. 567-577 (2005).

(Continued)

*Primary Examiner* — Eric Bolda
(74) *Attorney, Agent, or Firm* — Lawrence E. Anderson

(57) ABSTRACT

A beam combining device comprising at least one beam splitter and phase adjustment circuitry. The at least one beam splitter comprises a semi-reflective surface, first and second inputs, and first and second outputs operatively connected to receive first and second light beams. The semi-reflective surface has first and second sides positioned such that light entering from one input is partially reflected through one output and partially transmitted through another output. The phase adjustment circuitry adjusts the relative phases of the first and second light beams so that light transmitted through the semi reflective surface from one input may be adjusted to have a phase which can cancels or constructively adds to light reflected from another input. Light having a combined power of the light beams, or a fraction thereof, may be selectively emitted through a selective output depending upon the adjustment of phases. Also, a method of operation is claimed.

20 Claims, 11 Drawing Sheets

(56) References Cited

U.S. PATENT DOCUMENTS

| | | |
|---|---|---|
| 2002/0089720 A1 | 7/2002 | Steinberg |
| 2002/0191598 A1 | 12/2002 | Mays |
| 2004/0036978 A1 | 2/2004 | Gullapalli |
| 2007/0025731 A1 | 2/2007 | Schofield |
| 2007/0217739 A1* | 9/2007 | McGreer ............... G02B 6/125 385/32 |
| 2007/0258126 A1 | 11/2007 | Gorrell |
| 2008/0170598 A1 | 7/2008 | Kireev et al. |
| 2012/0154894 A1* | 6/2012 | Johnson ............... G02F 1/011 359/279 |
| 2012/0212802 A1 | 8/2012 | Rothenberg et al. |

OTHER PUBLICATIONS

J.R. Leger, M. Holz, G.J. Swanson, W.B. Veldkamp, "Coherent laser beam addition: an application of binary-optics technology," The Lincoln Laboratory Journal, vol. 1, No. 2, pp. 225-246 (1988).

A. Vasilyev, E. Petersen, N. Satyan, G. Rakuljic, A. Yariv, J. White, "Coherent power combining of chirped-seed erbium-doped fiber amplifiers," IEEE Photonics Technology Letters, vol. 25, No. 16, pp. 1616-1618 (2013).

J. White, A. Vasilyev, J.P. Cahill, N. Satyan, O. Okusaga, G. Rakuljic, C.E.Mungan, A. Yariv, "Suppression of stimulated Brillouin scattering in optical fibers using a linearly chirped diode laser," Optics Express, vol. 20, No. 14, pp. 15872-15881 (2012).

\* cited by examiner

FIG. 2 Block diagram showing the input and output functions of the 2×2 optical switch.

An isometric depiction of a 4 × 4 optical switch.

FIG. 7  Apparatus for combining the output of four amplifiers and sending the combined beam in any one of four directions, or to four delivery fibers.

OPTICAL DEVICE FOR BEAM COMBINING AND/OR ROUTING AND METHOD

STATEMENT OF GOVERNMENT INTEREST

The invention described herein may be manufactured, used, and licensed by or for the United States Government without the payment of royalties.

BACKGROUND OF THE INVENTION

The power output of lasers is typically limited by catastrophic damage to the components due to the high intracavity intensities. Use of a master-oscillator/power-amplifier (MOPA) configuration allows the power to be increased, but for amplifiers of finite cross sectional area, the output power can still limited by damage at the exit face. Further increases in the power of a MOPA system can be obtained by combining multiple amplifiers in parallel. For incoherent combination, there is no fixed phase relationship between the electromagnetic field emitted by the various amplifiers. For coherent combination, there is. If, in addition, the emitted wavefronts are planar and in-phase, the divergence of the output will be smaller for coherent combination than it would be for incoherent combination. This comparison assumes the same wavelength and total aperture size in both cases. A smaller divergence for coherent combination leads to a smaller spot in the far-field, or in the focal plane of a lens. The same power in a smaller spot means a higher intensity on the sample or target.

For both coherent and incoherent combination, spatial variations in the intensity of the output beams will increase the divergence. Even if the intensities are spatially uniform, if there are gaps between the multiple apertures, e.g., when circular apertures are arranged in a hexagonal pattern, the divergence will increase. For this reason, it is sometimes desirable to spatially overlap the output beams, thereby increasing the fill factor and decreasing the divergence.

Electronic control of the relative phases of the multiple outputs allows for a degree of beam steering without the need for a moving mirror. Such a system is called a phased array. Beam steering with a phased array can be used to engage a moving target, for example. Usually it is done with collimated beams and no additional optics.

SUMMARY OF THE INVENTION

A preferred embodiment beam combining device comprises:

at least one beam splitter comprising a semi-reflective surface; first and second inputs, and first and second outputs; the at least one beam splitter operatively connected to receive first and second light beams at the first and second inputs, respectively; the semi-reflective surface having first and second sides positioned such that light entering the first input and illuminating the first side is partially reflected through the first output and partially transmitted through the second output; and light entering the second input illuminating the second side is partially transmitted though the first output and partially reflected through the second output:

phase adjustment circuitry for adjusting the relative phases of the first and second light beams; the phases being adjustable such that when light transmitted through the semi reflective surface from the first input has a phase which cancels light reflected from the semi reflective surface from the second input, and light reflected from the semi-reflective surface from first input constructively adds to the light transmitted through the semi-reflective surface from the second input, then light having the combined power of the first and second light beams is emitted through the first output; and when light transmitted through the semi-reflective surface from the first input has a phase which constructively adds to light reflected from the semi-reflective surface from the second input, and light reflected from the semi-reflective surface from first input destructively interferes with the light transmitted through the semi-reflective surface from the second input, then light having the combined power of the first and second light beams is emitted through the second output;

whereby depending upon the adjustment of phases of the first and second light beams, the power of the light outputted from either the first or second outputs may be controlled.

The power emitted may be the summation of the power of the first and second light beams or fractions thereof. For example, one output may be the summation of the powers of the first and second light beams, or a fraction thereof, and the power of light outputted from the other output may be substantially zero, or a fraction thereof. Emission through the first or second output can be selected by varying the phase differential between the first and second light beams (without mechanical input). Optionally, the device may comprise a plurality of light detectors operatively connected to each output of the beam splitter to measure the power of the light from each of the outputs of the beam splitter. Optionally, the phase adjustment circuitry may operate to selectively and individually adjust each output in a range from substantially no light to the summation of the powers of the inputted light beams. Optionally, in addition to a plurality of photodetectors, feedback circuitry may be operatively connected to the phase adjustment circuitry and the photodetectors, such that the measurement detected by the plurality of photodetectors is used to control the phase of the first and second laser beams.

Optionally, four beam splitters may be utilized, each having first and second inputs, a semi-reflective surface and first and second outputs. Four light beams may be inputted into the first and second inputs of the first and second beam splitters. In one embodiment, the first and second outputs of the first and second beam splitters are operatively connected to the first and second inputs of third and fourth beamsplitters, respectively; and the first and second outputs of the third and fourth beamsplitters selectively output a laser beam depending upon the phase of the four inputted light beams. Optionally, a photodetector may be associated with each output of the beamsplitters to measure the power of the light emitted from the associated output. Optionally, each photodetector may be operatively associated with a beam sampler and operatively connected to the phase adjustment circuitry, such that the phase adjustment circuitry receives inputs from the plurality of photodetectors. Optionally, the phase adjustment circuitry may further comprise a computer and a plurality of phase lock loop circuits, each of the phase lock loop circuits and the computer receiving the output of one of the plurality of photodetectors and operating to adjust the phases of the first and second light beams relative to the reference light beam.

A preferred method comprises:

inputting at least four laser light beams into first and second beam splitters; each of the first and second beam splitters having first and second inputs and first and second outputs;

operatively connecting first and second outputs of the first and second beam splitters to first and second inputs of third and fourth beamsplitters, respectively; the third and fourth beam splitters each have two outputs;

providing phase adjustment circuitry for varying the relative phase of each of the four laser beams; and by varying the phase of the at least four laser light beams, selectively emitting an output beam from one of four outputs of the third and fourth beam splitters which has the combined power of the at least four inputted beams.

Other characteristics and features are described in the following drawings and detailed description of the preferred embodiments.

BRIEF DESCRIPTION OF THE DRAWINGS

The foregoing and other objects, features, and advantages of the invention will be apparent from the following more detailed description of the preferred embodiments of the invention, as illustrated in the accompanying drawings, wherein.

Figure 1:
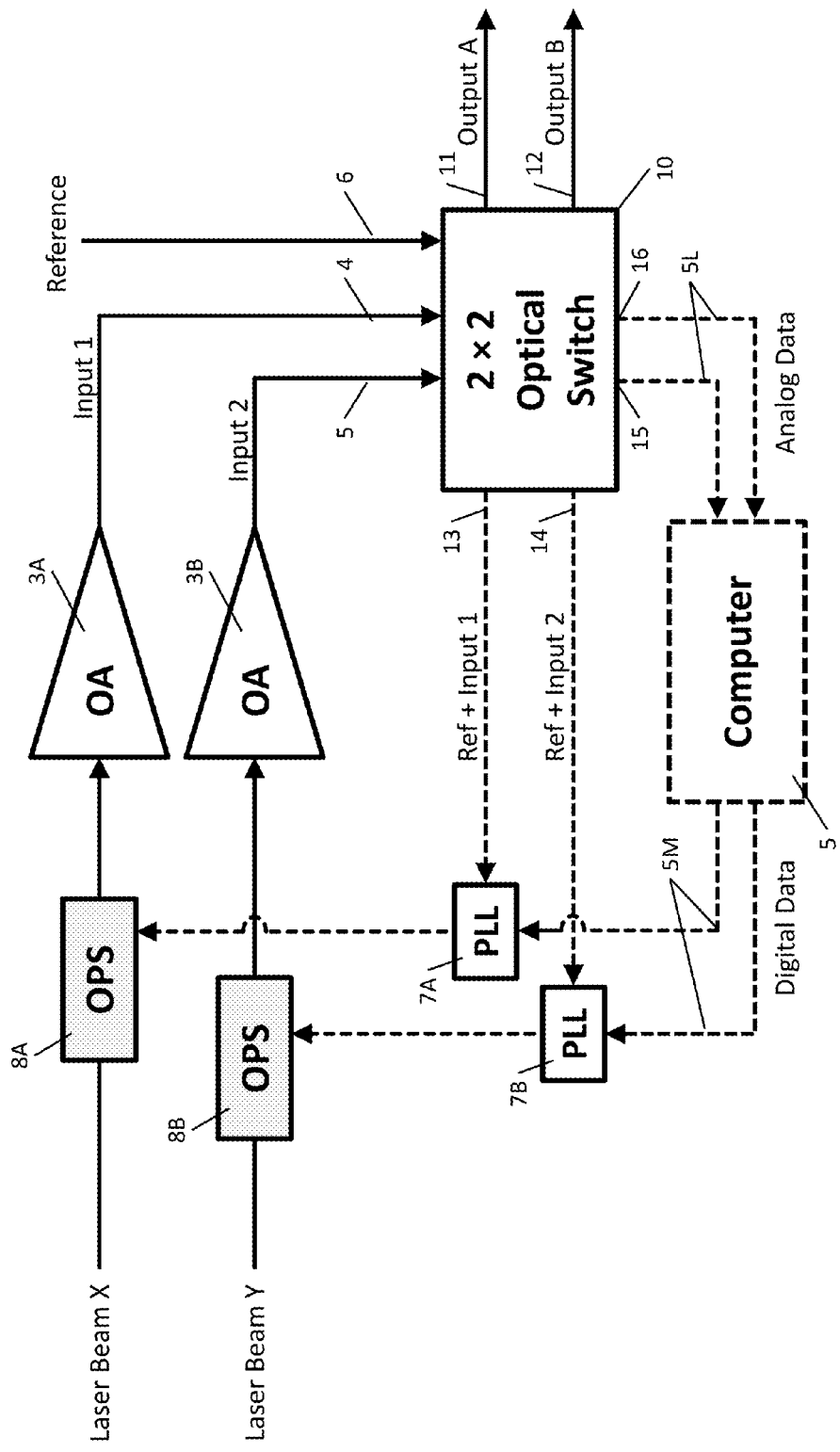
FIG. 1 is a schematic illustration showing a system comprising a preferred embodiment 2×2 optical switch. Optical beams or fibers are shown with solid lines; electrical signals are shown with dashed lines.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DESCRIPTION OF THE PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those with skill in the art to practice the embodiments of the invention. Accordingly, the examples should not be construed as limiting the scope of the embodiments of the invention. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" or "operatively connected" to another element, it can be directly connected or coupled to the other element or intervening elements may be present. In contrast, when an element is referred to as being "directly connected" or "directly coupled" to another element, there are no intervening elements present.

It will be understood that, although the terms first, second, third, fourth, etc. may be used herein to describe various elements, sections, sides, or components, these elements, sections, sides, or components should not be limited by these terms. For example, when referring to first and second sides, these terms are only used to distinguish one side from another side. Thus, a first element, section, side, or component discussed below could be termed a second, third or fourth element, section, side or component without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

2×2 Optical Switch

A system designed to make use of coherent beam combining requires the individual laser beams to (a) be locked in phase and frequency, (b) have a relative phase difference that results in the power being concentrated in a single lobe in the far-field, or in the focus of a lens, (c) have planar wavefronts, and (d) have a spatially uniform intensity.

Monitoring the relative phase is typically done by interfering the beams with each other or with a reference. The former has the usual disadvantages associated with a homodyne feedback loop. The latter can be done with a heterodyne feedback loop, where the reference beam has an offset frequency relative to all the signal beams. The beat signal between the reference beam and each output beam is therefore nominally at the offset frequency. By controlling the phase of each beat signal relative to a local oscillator, one can control the relative phases of the various output beams.

As shown in FIG. 1, a preferred embodiment assembly comprises two input laser beams X, Y, two optical phase shifters 8A, 8B, two optical amplifiers 3A, 3B, a 2×2 optical switch 10, two possible output ports (11 or 12), two phase-locked loop circuits 7A, 7B, and a computer 5. The solid lines represent optical beams or fibers. The dashed lines represent electrical signals or wires. The feedback loops (5L, 5M, 7A, 7B, 13, and 14) control the relative phase between the two input laser beams X, Y. The system including the optical phase shifters and optical amplifiers comprises two opto-electronic feedback loops that allow the output beam to be electronically switched between the two outputs without having the speed and reliability limitations associated with a moving part. The output location containing the combined laser beam is determined by user input to a program running on computer 5, for example.

Referring to FIG. 1, using precise control over the relative phase difference, two input beams are interferometrically combined into one output beam at either port 11 or 12. To do this, the optical switch 10 shown in FIG. 1 makes use of feedback loops which causes the phase-locked loop (PLL) circuits 7A, 7B to adjust the relative phase difference to maintain coherence between each channel (i.e., the two input laser beams 1A, 1B) and a reference beam. The phase-locked loop circuits 7A, 7B may be, for example, a phase detector or phase comparator comprising a frequency mixer, analog multiplier or logic circuit that generates a voltage signal which represents the difference in phase between two signal inputs. The relative phase difference between both channels is not fixed though, so another feedback loop may be used to maintain a fixed phase relationship between the two channels. Also, a feedback mechanism (shown in dotted lines as computer program 5 and dashed lines 5L, 5M) is utilized to prevent the relative phase between the beams from slipping out of coherence with each other. The phase control loop comprises optical phase shifters 8A, 8B and optical amplifiers 3A, 3B discussed above. The optical amplifiers may be, for example, Ytterbium fiber amplifiers. The computer feedback loop is shown in dashed lines comprising computer 5, ports 15, 16, and connecting lines 5L, 5M. The 2×2 Optical Switch 10 comprises input ports 4 and 5 from the respective channels for Inputs 1 and 2 and a reference beam input port 6. Output ports 11 and 12 may be selected for outputting the combined laser beam. Feedback ports 15, 16 connect via lines 5L to a processor or computer 5 which includes a computer program and is connected to the phase-locked loop circuits 7A, 7B via lines 5M. The 2×2 optical switch further comprises output ports 13, 14. Port 13 outputs the reference (from port 6) plus the input 1 from port 4. Port 14 outputs the reference (from port 6) plus input 2 from port 5. The outputs from ports 13, 14 are inputted into the phase-locked loop circuits 7A, 7B to maintain coherence between each channel (i.e., the two input laser beams A, B) and a reference beam. The phase-locked loop circuits 7A and 7B are connected to each of the optical frequency shifters 8A, 8B to shift the frequency to maintain coherence.

The optical switch 10 may be made mechanically stiff and isolated from sources of vibration, in order that the components maintain as well as possible the spacing and alignment necessary to obtain complete constructive and destructive interference at the outputs. The feedback signals from ports 13 and 14 are there to compensate for residual environmental effects that would otherwise degrade the interference.

Figure 2:
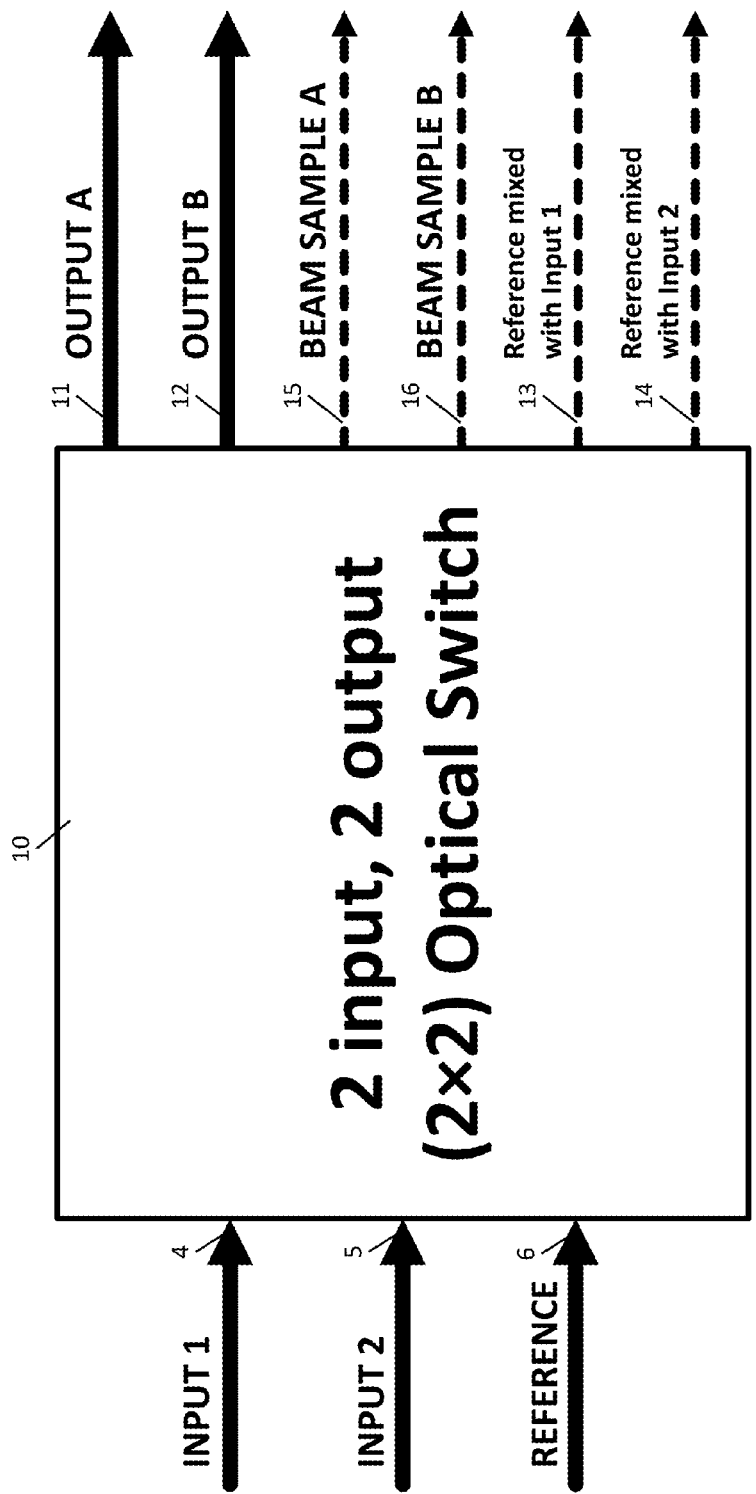
FIG. 2 is a block diagram showing the input and output functions of a preferred embodiment 2×2 optical switch. The solid lines represent optical beams. The dashed lines represent electrical signals or wires.

FIG. 2 is a block diagram showing the inputs to switch 10 on the left and the outputs of switch 10 on the right. The switch has two laser beam input ports 4, 5, a reference beam input port 6, two laser beam output ports 11 and 12, two electrical feedback ports 15 and 16 for the outputs to the computer 5, and two electrical feedback ports 13 and 14 for outputting the signal due to the interference between the reference and Input 1 and the signal due to the interference between the reference and Input 2, respectively, to the phase-locked control circuits 7A and 7B. The four electrical outputs are generated by four photodiodes 23, 24, 25 and 26 (shown in FIG. 3) which sample the output beams as well as monitor the interference between the reference and input beams. The reference beam (inputted from input port 6) is used to phase lock each channel with the phase-locked loop circuits 7A, 7B, and is necessary to maintain a constant relative phase difference between Input 1 and Input 2. On the switch 10, there are two electrical outputs labeled Beam Sample A (port 15) and Beam Sample B (port 16) that indicate the output powers which depend on the phase difference between Input 1 and Input 2.

Figure 3:
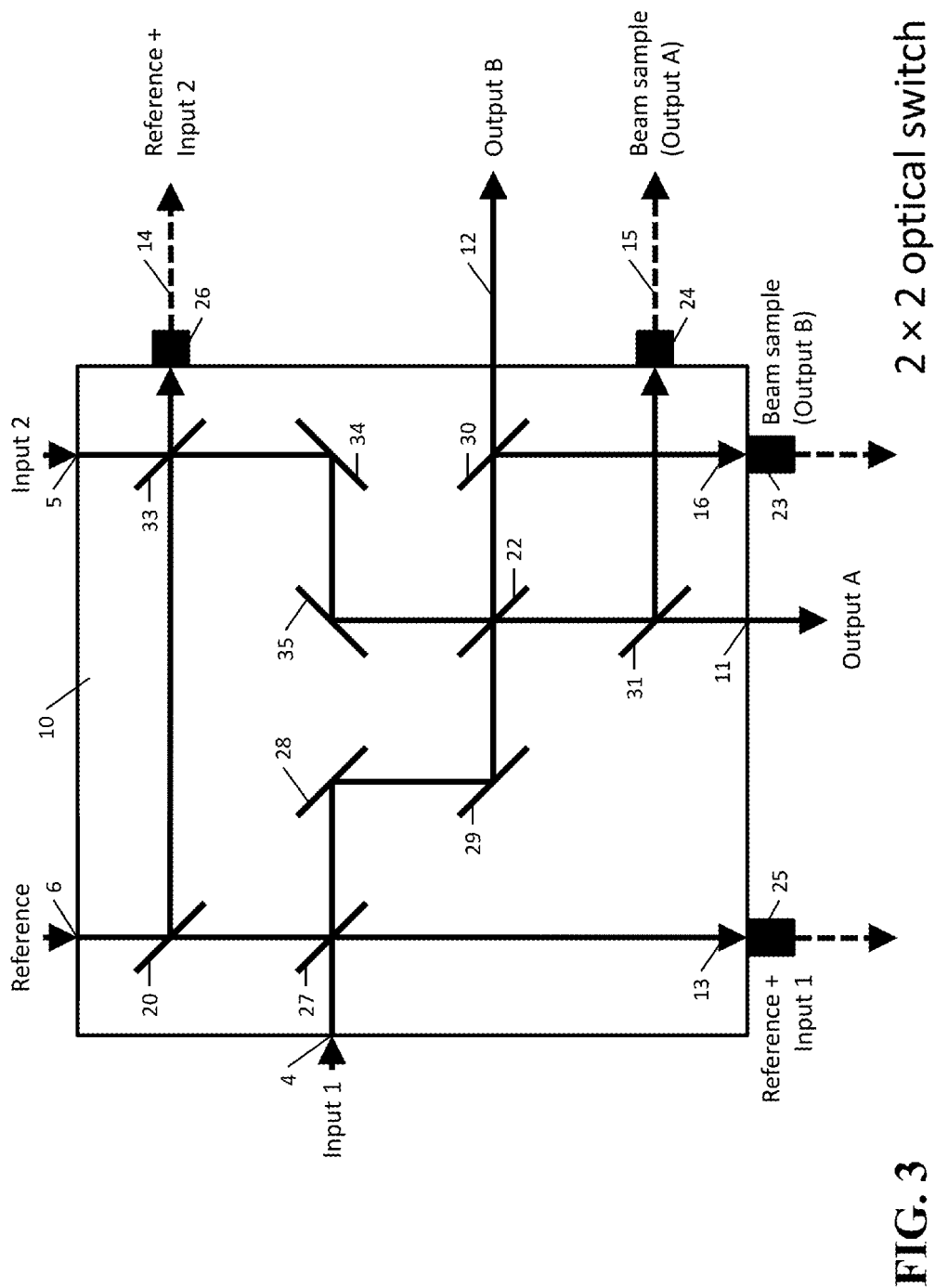
FIG. 3 is a schematic illustration showing the inner components of a preferred embodiment optical switch 10.

FIG. 3 is a more detailed view of a preferred embodiment 2×2 optical switch. If inputs 1 and 2 are equal in power, beamsplitter 22 should have a reflectivity of ~50% and a transmissivity of ~50%. If inputs 1 and 2 are unequal in power, the reflectivity of beamsplitter 22 may be adjusted in order that the reflected portion of input 1 has the same power as the transmitted portion of input 2. The beam samplers have a reflectivity of ~1% and a transmissivity of ~99%, for example. In addition, four photodiodes 23, 24, 25 and 26 (shown in FIG. 3) sample the output beams as well as monitor the combination of the reference and input beams. The reference beam (inputted from input port 6) is used to phase lock each channel with the phase-locked loop circuits 7A and 7B, and is necessary to maintain a constant relative phase difference between Input 1 and Input 2. On the switch 10, there are two beam samples labeled Beam Sample A (port 15) and Beam Sample B (port 16) that are used to measure the actual phase difference between Input 1 and Input 2.

Referring to FIG. 3, Input 1 is partially reflected by a optical sampler or wedge 27 into a photodetector 25. As an example, optical wedges may reflect about 1 to 4% of the light beam. Rather than using a wedge, an optical-quality thick glass plate tilted to the beam can also be utilized. The light which passes through the sampler or wedge 27 is reflected by mirrors 28, 29 into beam splitter 22, which may be a 50/50 beam splitter. As an alternative, the beam splitter may be variable with respect to the transmittance/reflectance or accommodate variances between the intensities of input 1 and input 2. A sampler 30 reflects a portion of the beam directed to output 12 into detector 23. A sampler directs the portion of the beam directed to output port 11 into photo detector 24. It can be appreciated by those of ordinary skill in the art that photodetectors 24 and 23 detect the intensity of light for output A and output B, respectively, passing through the respective ports 11 and 12.

Referring now to input 2 at port 5 in FIG. 3, the incoming laser beam is partially reflected by a wedge 33 into a photodetector 26. Again, the wedge may reflect only approximately one to four percent of the light. The light which passes through the wedge 33 is reflected by mirrors 34 and 35 into beam splitter 22. The beam splitter may be a 50/50 beam splitter. A sampler (or wedge) 30 reflects a portion of the beam directed to output port 12 into detector 23. Another sampler or wedge 31 directs the portion of the beam directed to output port 11 into photo detector 24. Thus, the detector 23 measures the intensity of output B and detector 24 measures the intensity of output A.

Referring now to the reference input at port 6, the reference light illuminates the beam splitter 20 which transmits 50% and reflects 50% of the light. The transmitted portion from beam splitter 20 illuminates the sampler 27 such that the reflected portion of the input 1 and the transmitted portion of the reference is measured by photodetector 25 at port 13, for further output into the phase lock circuitry 7A, which controls the optical phase shifters SA, which regulate the phase of the inputted laser beams as shown in FIG. 1. The reflected portion from beam splitter 20 passes through sampler 35 and is detected by photodetector 26 at output port 14, for further output into the phase lock circuitry 7B.

Beamsplitter 20 divides the reference beam into two approximately equal parts. Beam sampler 27 combines a small portion of input 1 with a portion of the reference for the purpose of interfering on photodiode 25. Beam sampler 33 combines a small portion of input 2 with a portion of the reference, for the purpose of interfering on photodiode 26. Beamsplitter 22 reflects part of input 2 and transmits part of input 1, allowing the two to interfere to generate output B. Beamsplitter 22 also transmits part of input 2 and reflects part of input 1, allowing the two to interfere to generate output A. Beam sampler 30 directs a small portion of output B to photodiode 23 to measure the power of output B. Beam sampler 31 directs a small portion of output A to photodiode 24 to measure the power of output A.

Figure 4:
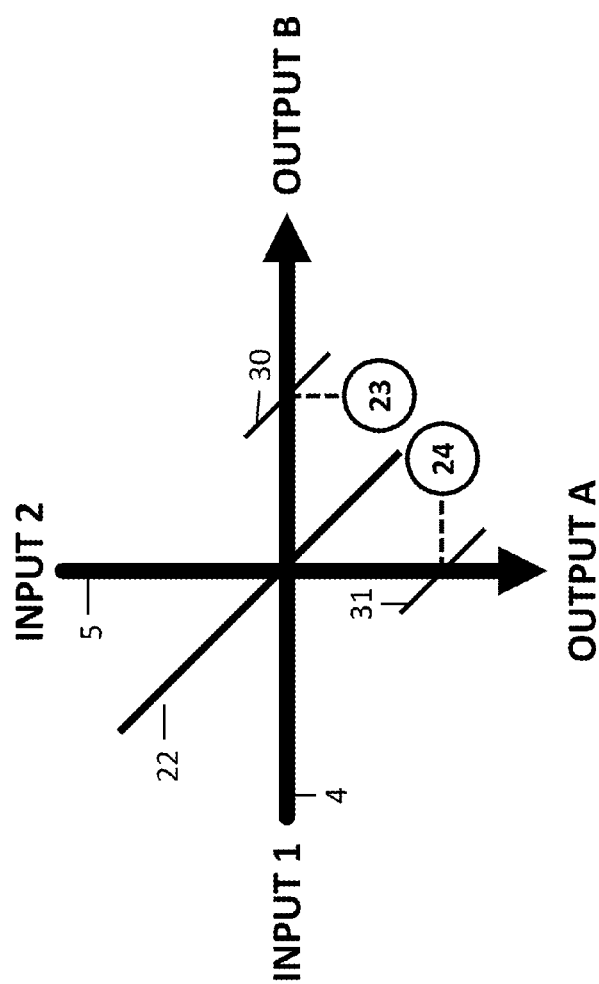
FIG. 4 is a diagrammatic illustration of a portion of FIG. 3 showing the interaction of input 1 and input 2 at beam splitter 22.

Referring now FIG. 4, which is a diagrammatic explanation of the effect of phase difference/control of input 1 and input 2 at the interface of the beam splitter 22. Input 1 and Input 2 each illuminate the beam splitter 22. The measurement at photodetector 23 indicates the power due to the interference of the reflected part of input 2 and the transmitted part of Input 1. The measurement at photodetector 24 indicates the power due to the interference of the transmitted part of Input 2 and the reflected part of Input 1. If the measurement at photodetector 23 is zero and the measurement at photodetector 24 is non-zero, there is destructive interference in the direction of Output B and constructive interference in the direction of Output A. As a result, a beam having the combined power of input 1 and input 2 will form Output A. Subsequently, the operator may change the phase difference between Input 1 and Input 2 such that the measurement at photodetector 23 is non-zero and the measurement at photodetector 24 is zero, indicating destructive interference in the direction of Output A. As a result, a beam having the combined intensity of input 1 and input 2 will form Output B.

The phase is controlled by the outputs from port 13, 14, which are connected, as shown in FIG. 1 to the phase-locked loop circuits 7A, 7B. Also inputted into phase-locked loop circuits 7A and 7B are the output of the processor which operates the computer program 5. The ports 15, 16 on optical switch 10 are inputted into the processor or computer 5 through lines 5L, from which data is extracted to perform an algorithm by computer 5.

Computer Control

The program run by computer 5 is used to control the phase (via the electronic feedback loop) and can be implemented with, for example, LabWindows™. The program takes input from the user and the switch and sends digital characters to the phase-locked loop (PLL) circuits 7A, 7B, which may be, for example, via a USB connection. The user selects which port (11 or 12) will contain the output beam. The program digitizes the voltage from photodiodes 23 and 24, and sends the signals to PLL 7A, 7B to adjust the phases of beams X and Y. The program algorithm (operated on by computer 5) uses a dither in combination with the readings from the photodiodes 23, 24 to decide whether or not the relative phase between the two input beams Input 1 or Input 2 should be increased or decreased. After initiating the program, the phase is continually probed until a maximum is reached, at which point the dither and the input voltage will begin to oscillate. Phase-locked loop circuitry 7A, 7B is configured to receive signals from the connection; therefore, an increase or decrease in the phase correlates to the computer sending certain signals to phase-locked loop circuitry 7A, 7B. The computer feedback loop is shown in FIG. 1.

Applications

High power, low-divergence lasers have military applications, e.g. counter rockets, artillery, and mortars (CRAM), and industrial applications, e.g. welding.

A preferred embodiment 2×2 optical switch has distinct advantages over single output systems for directed energy applications. An opto-electronic switch allows for very fast changing of outputs without the speed limitations associated with mechanical movement. The direct application of a 2×2 optical switch coupled with HEL is for defense against large ballistic threats aimed at manned or unmanned vehicles. In one scenario, two 1-kW amplifiers are located in the interior of a helicopter, and two delivery fibers lead to conformal exit apertures on the left and right side of the fuselage. The switch would be able to direct 2 kW into the delivery fiber leading to the left side to engage a target in that direction. A short time later, the switch could direct 2 kW to engage a target on the right side of the helicopter.

The optical switch 10 could be largely monolithic; i.e., made from a single block of material. The rigidity would reduce the impact of external vibrations. The switch would need to be enclosed to eliminate dust and other contaminants that would result in optical damage.

4×4 Optical Switch

Figure 5:
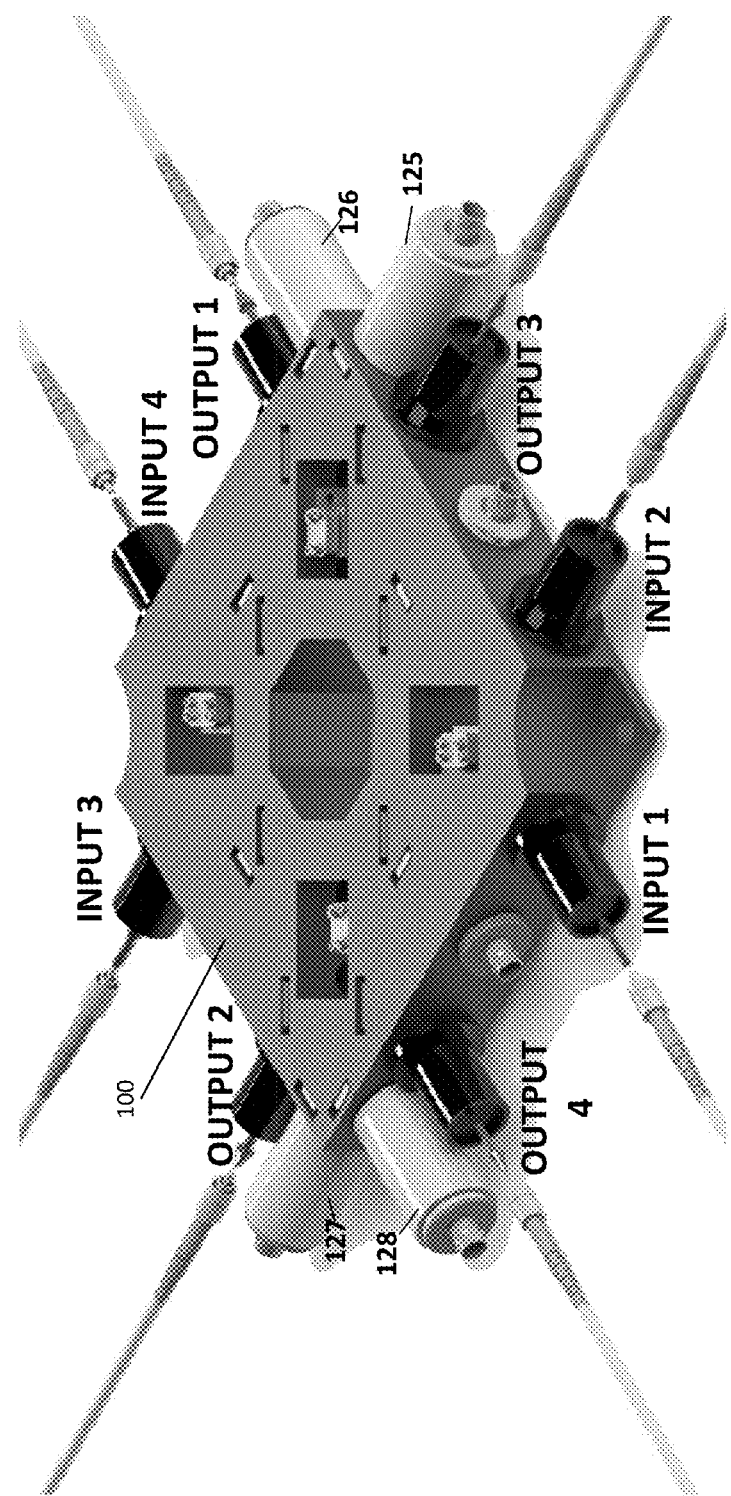
FIG. 5 is an isometric depiction of a preferred embodiment 4×4 optical switch.
Figure 6:
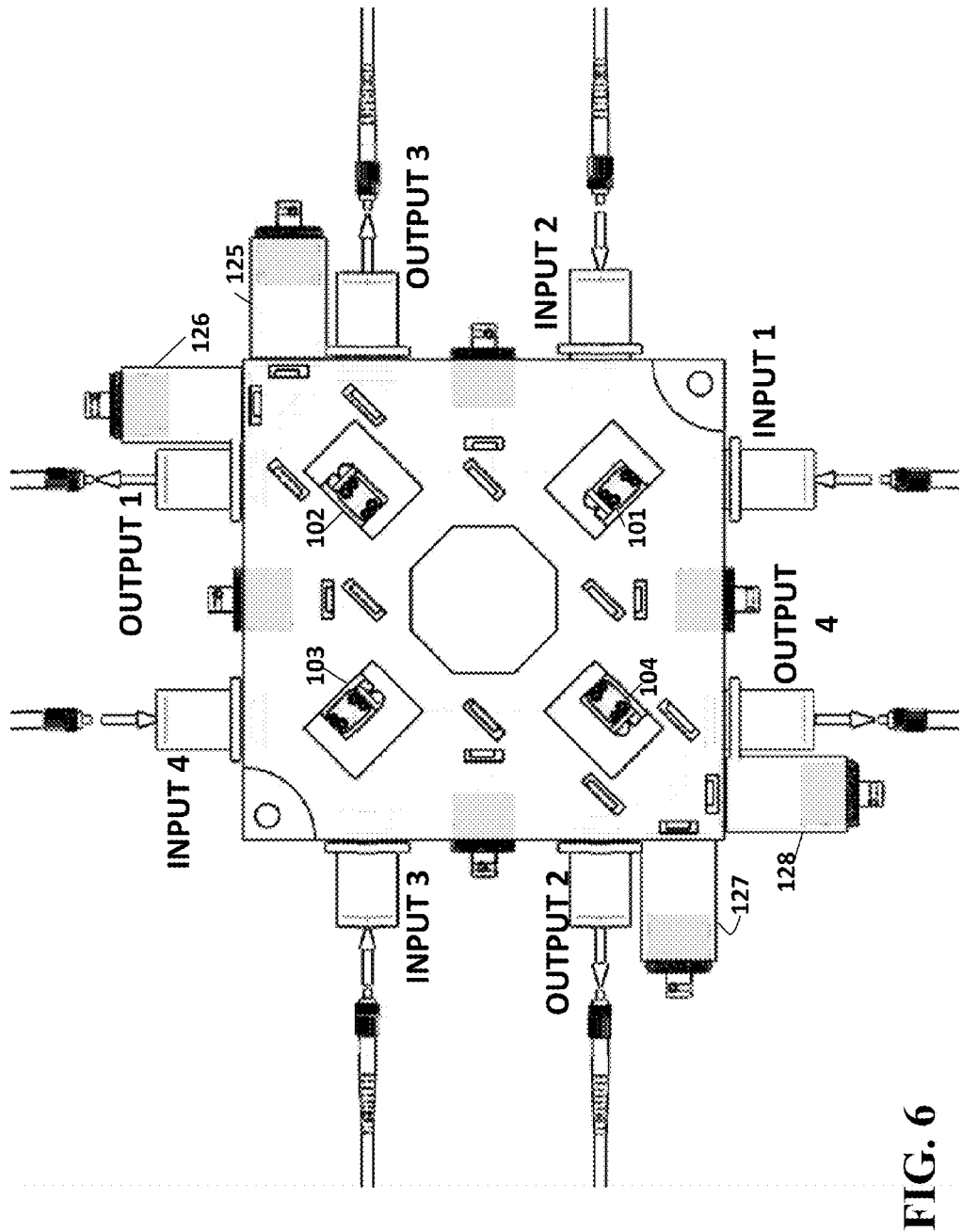
FIG. 6 is a top view of the preferred embodiment shown in FIG. 5.
Figure 7:
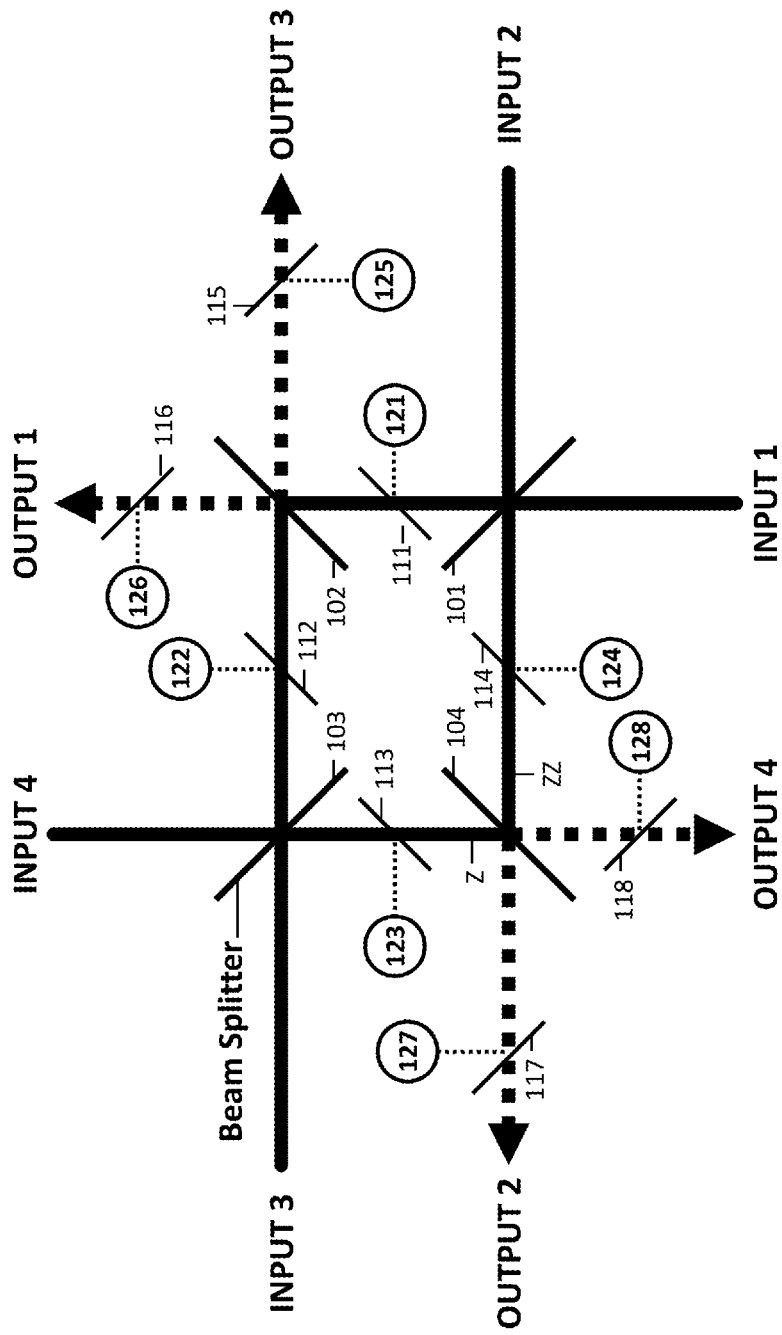
FIG. 7 is a schematic view of the preferred embodiment shown in FIG. 5.

A preferred embodiment 4×4 optical switch 100 is illustrated in FIGS. 5 through 7. Note that this switch is somewhat monolithic, and utilizes the same concepts from the preferred embodiment 2×2 switch of FIGS. 2-3. The preferred embodiment 100 enables coherent combination that can yield a higher intensity (smaller spot size) in the far field, and allows for electronic beam steering. The preferred embodiment of FIGS. 5-7 utilizes a coherent technique that allows one to combine the power of multiple amplifiers (seeded with a common source) or multiple phase-locked lasers, and direct the output beam to any one of four output ports or tour delivery fibers. No moving parts are required, but a means for adjusting the phase of each input beam is required. Typically, this is done with an electro-optic or acousto-optic phase modulator, in conjunction with photodiodes that detect the phase via interference.

The preferred embodiment illustrated in FIG. 7 comprises four 50/50 beamsplitters 101-104, each of which may be followed by two beamsamplers, 111-118, and eight light detectors 121-128 to ascertain the distribution of light inside the switch and light leaving the switch. Alternatively, a total of four beam samplers and four detectors could be utilized, but the feedback algorithm would be more complicated.

Referring now to FIG. 7, input 1 illuminates beam splitter 101, and the reflected portion is sampled by sampler 114 and measured by detector 124. The transmitted portion is sampled by sampler 111 and measured by detector 121. The transmitted portion then illuminates beam splitter 102, which reflects a portion in the direction of output 3 (which is sampled by sampler 115 and measured by detector 125) and transmits a portion in the direction of output 1 (which is sampled by sampler 116 and measured by detector 126). Input 2 illuminates beam splitter 101, and the reflected portion is sampled by sampler 11 and measured by detector 121. The transmitted portion is sampled by sampler 114 and measured by detector 124. The transmitted portion then illuminates beam splitter 104, which reflects a portion in the direction of output 4 (which is sampled by sampler 118 and detector 128) and transmits a portion in the direction of output 2 (which is sampled by sampler 117 and detector 127). Input 3 illuminates beam splitter 103, and the reflected portion is sampled by sampler 113 and measured by detector 123. The transmitted portion is sampled by sampler 112 and measured by detector 122. The transmitted portion then illuminates beam splitter 102, which reflects a portion in the direction of output 1 (which is sampled by sampler 116 and detector 126) and transmits a portion in the direction of output 3 (which is sampled by sampler 115 and detector 125). Input 4 illuminates beam splitter 103, and the reflected portion is sampled by sampler 112 and measured by detector 122. The transmitted portion is sampled by sampler 113 and measured by detector 123. The transmitted portion then illuminates beam splitter 104, which reflects a portion in the direction of output 2 (which is sampled by sampler 117 and detector 127) and transmits a portion in the direction of output 4 (which is sampled by sampler 118 and detector 128).

Referring again to FIG. 7, if only input 1 were present at beam splitter 101, half the power would be reflected and half would be transmitted. The same goes if only input 2 were present. When they are both present, and coherent with respect to one another, the relative phase will determine whether all of the combined power goes in the direction of beamsampler 111, or all goes in the direction of beamsampler 114. All other distributions in between are also possible. To ascertain what the distribution is, a small portion of the light incident on beamsampler 114 is directed to detector 124 and a small portion of the light incident on beamsampler 111 is directed to detector 121. In the preferred embodiment, the electrical signals from 121 and 124 are sent to a computer. If the switch is to direct the total power to output 1, the computer algorithm will seek to maintain a null signal on detector 124 by adjusting the relative phase between inputs 1 and 2. By the same token, the computer algorithm will seek to maintain a null signal on detector 123 by adjusting the relative phase between inputs 3 and 4. At this point, the total power from all four inputs is propagating toward beamsplitter 102. To ascertain the distribution of power on the output side of beamsplitter 102, beamsamplers 115 and 116 and photodetectors 125 and 126 are used in the same fashion as above. To direct the total power to output 1, the computer algorithm will seek to maintain a null signal on photodetector 125, by adjusting the average phase of inputs 1 and 2 relative to the average phase of inputs 3 and 4. It should be clear that by adjusting the phases of the input beams, the total power can be directed to any one of the output beams. Similarly, an equal amount could be directed to each output, or any combination in between, by proper adjustment of the phases of the input beams.

Figure 8:
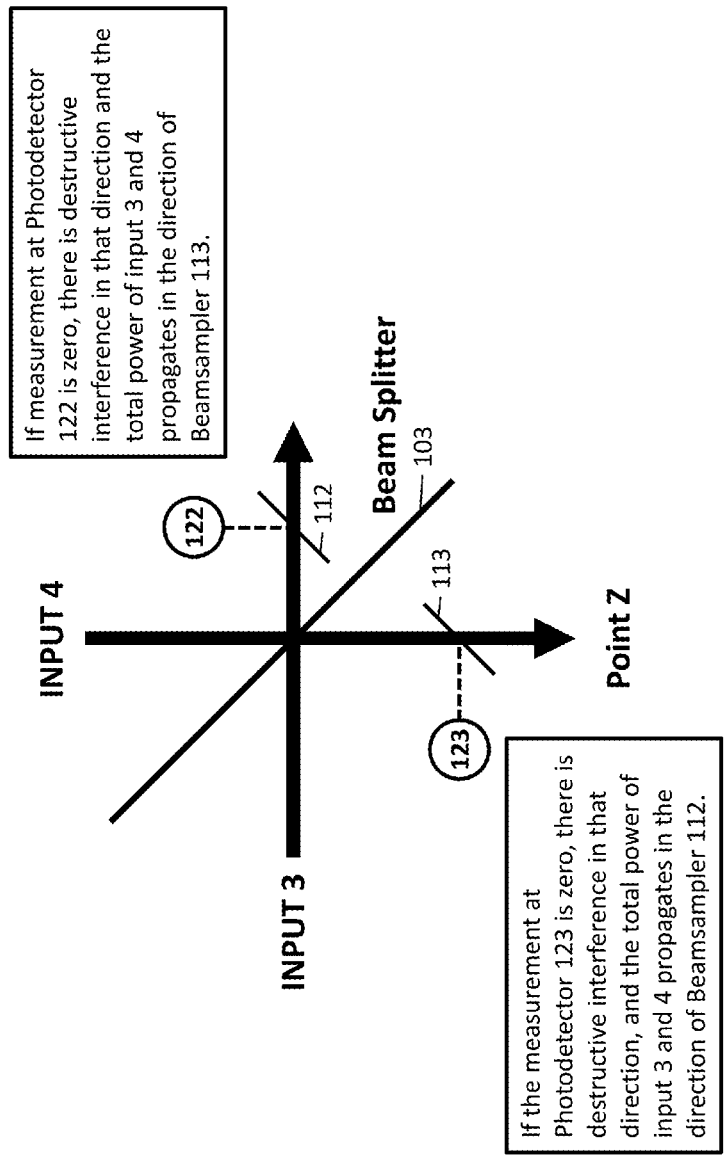
FIG. 8 is a diagrammatic illustration of a portion of FIG. 7 showing the interaction of the beams from inputs 3 and 4 at the beamsplitter 103.
Figure 9:
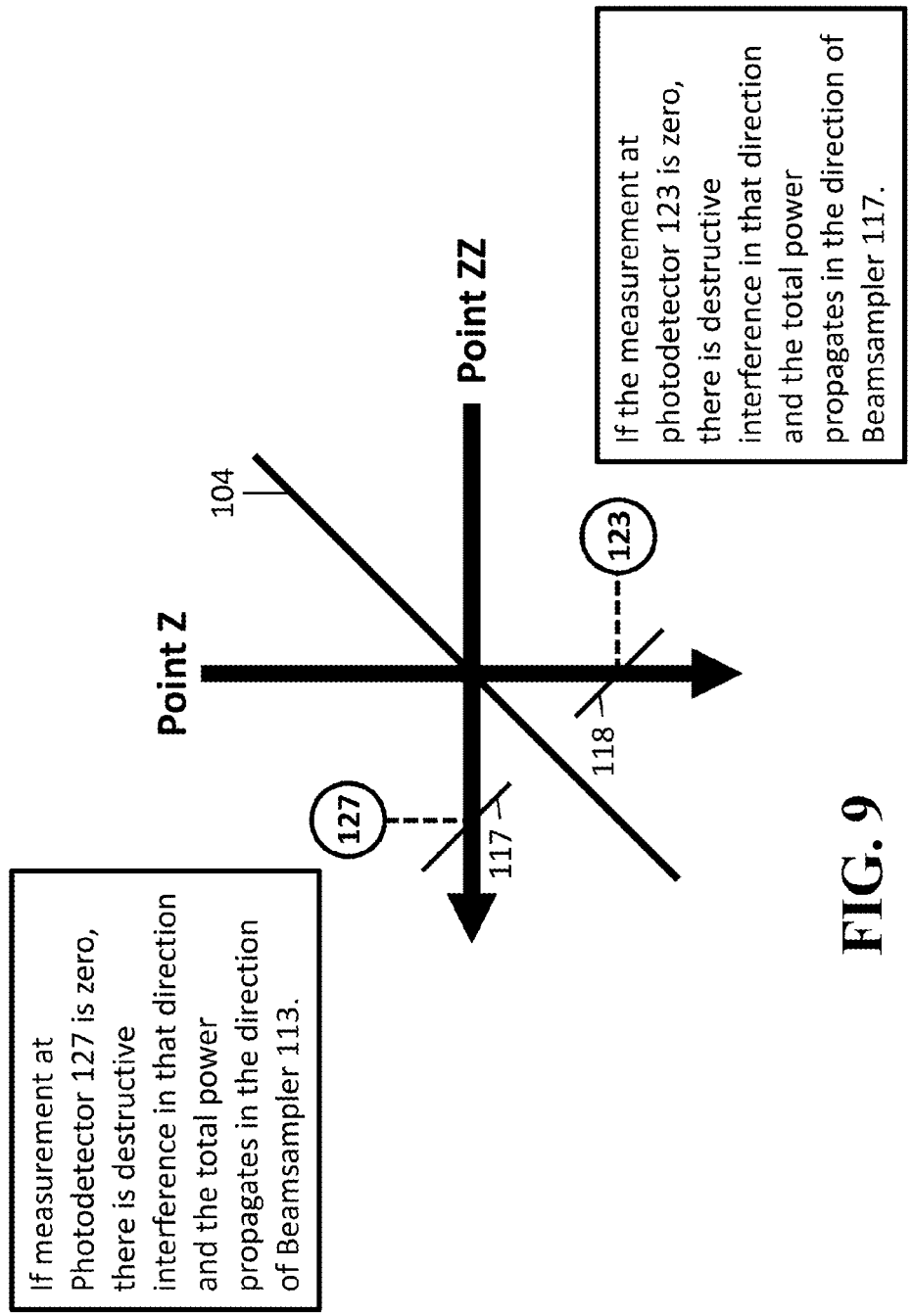
FIG. 9 is a diagrammatic illustration of a portion of FIG. 7 showing the interaction of the beams at beamsplitter 104.
Figure 10:
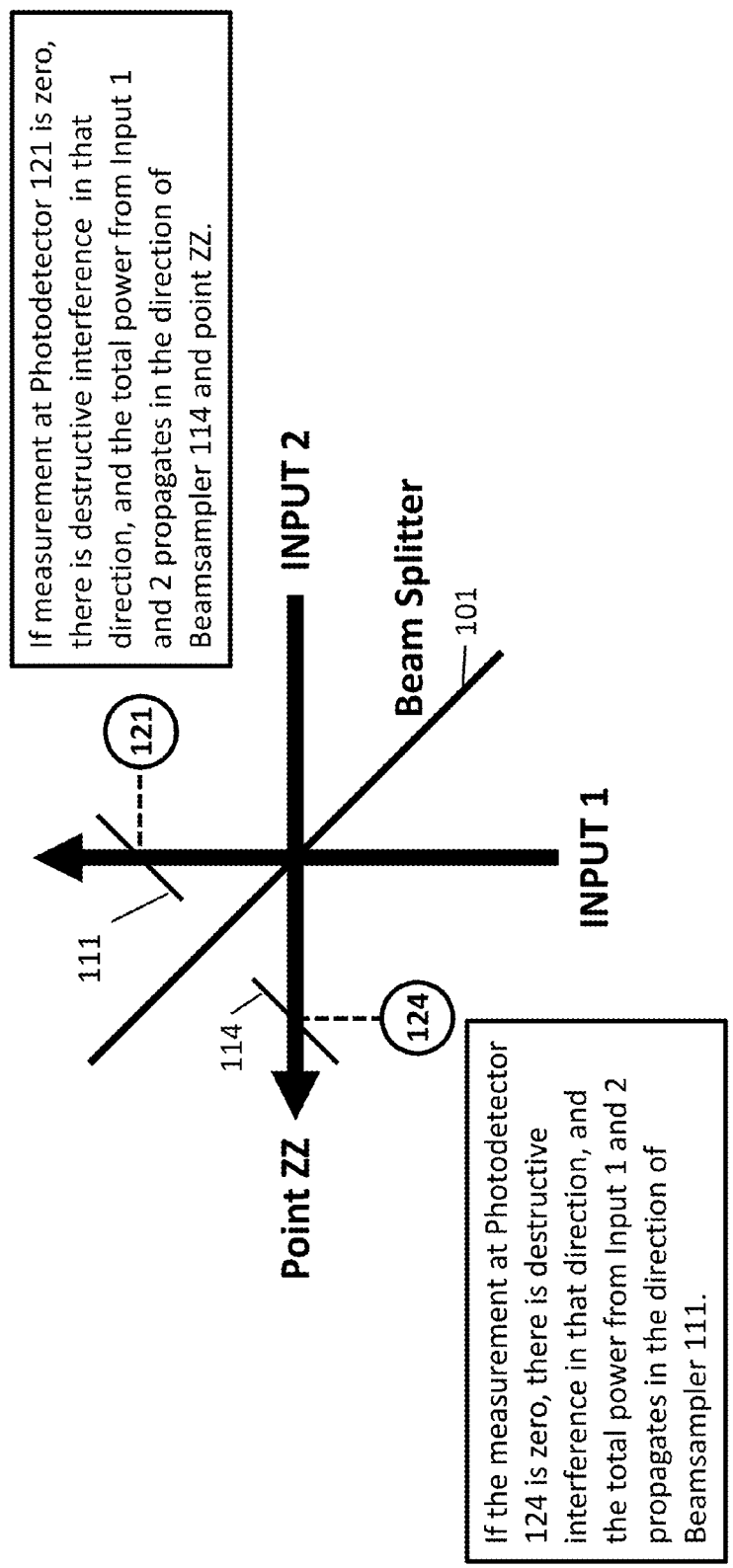
FIG. 10 is a diagrammatic illustration of a portion of FIG. 7 showing the interaction of the beams at beamsplitter 101.

The interaction of the input beams is explained diagrammatically in FIGS. 8, 9, and 10. Referring now to FIG. 8, photodetector 122 measures the part of input 4 that is reflected by beamsplitter 103 and the part of input 3 that is transmitted by beamsplitter 103. Photodetector 123 measures the part of input 4 that is transmitted by beamsplitter 103 and the part of input 3 that is reflected by beamsplitter 103. If the signal from photodetector 122 is non-zero and the signal from photodetector 123 is zero, there is constructive interference in the direction of beamsampler 112 and destructive interference in the direction of beamsampler 113 and the total power of input 3 and 4 propagates in the direction of Beamsampler 112. Conversely, if the signal from photodetector 122 is zero and the signal from photodetector 123 is non-zero, there is constructive interference in the direction of beamsampler 113 and destructive interference in the direction of beamsampler 112 and the total power of inputs 3 and 4 propagates in the direction of beamsampler 113.

Assuming the signal from detector 123 is non-zero, the light then illuminates beamsplitter 104 (FIG. 9). Photodetector 127 measures the portion of the beam coming from point Z in FIG. 7 that is reflected by beamsplitter 104 and the transmitted portion from point ZZ (FIG. 7) that is transmitted by beamsplitter 104. Photodetector 123 measures the part of the beam from Point Z in FIG. 8 and the reflected portion of the beam from Point ZZ that is reflected by beamsplitter 104. If the signal from photodetector 127 is zero and the signal from photodetector 123 is non-zero, there is destructive interference in the direction of beamsampler 117 and constructive interference in the direction of beamsampler 118. If the measurement at photodetector 123 is zero, there is destructive interference in that direction and the total power propagates in the direction of beamsampler 117.

Referring now to FIG. 10, which is centered on beam splitter 101, photodetector 121 measures the part of Input 2 that is reflected by beamsplitter 101 and the part of input 1 that is transmitted by beamsplitter 101. Photodetector 124 measures the part of Input 1 that is reflected by beamsplitter 101 and the part of input 2 that is reflected by beamsplitter 101. If the signal from photodetector 121 is zero and the signal from photodetector 124 is non-zero, there is destructive interference in the direction of beamsampler 111 and constructive interference in the direction of beamsampler 114 and the total power from Input 1 and 2 propagates in the direction of beamsampler 114 and point ZZ. Note that the beam formed by constructive interference continues on to FIG. 9 which can be visualized by connecting the Points ZZ. If the measurement at photodetector 124 is zero, there is destructive interference in that direction, and the total power from Input 1 and 2 propagates in the direction of beamsampler 111. It is noted that by selecting the phases of the inputted beams such that constructive interference occurs as outlined in FIGS. 9 and 10, the net result is that Output 4 will be the combination of four inputs, i.e., Inputs 1, 2, 3 and 4.

From a phase perspective, if Output 4 is the desired channel for the combination of the four beams, the following should take place: (1) the relative phases of Input 1 and Input 2, i.e., $\Phi_1-\Phi_2$ should be adjusted to either maximize the power on 124 or minimize the power on detector 121; (2) $\Phi_3-\Phi_4$ should be adjusted to maximize detector 123 or minimize detector 122; (3) the difference between $\Phi_1+\Phi_2$ (average phase of inputs 1 and 2) and $\Phi_3+\Phi_4$ (average phase of inputs 3 and 4) should be adjusted to maximize detector 128 or minimize detector 127.

As with all varieties of coherent beam combination, the efficiency of the device will depend on the extent to which the four inputs have parallel polarizations, are diffraction-limited, i.e, plane waves, and matched in power. If the input beams originate from fiber amplifiers, they need to be collimated with high quality lenses. There are also difficulties in stabilizing about a null or a maximum with a homodyne phase-locking circuit. Typically the latter are overcome using a dithering technique, or a hill-climbing algorithm, or by going to a heterodyne technique. All these techniques are possible with this apparatus. In addition, it can function with a chirped beam to suppress stimulated Brillouin scattering in high power fiber amplifiers.

Figure 11:
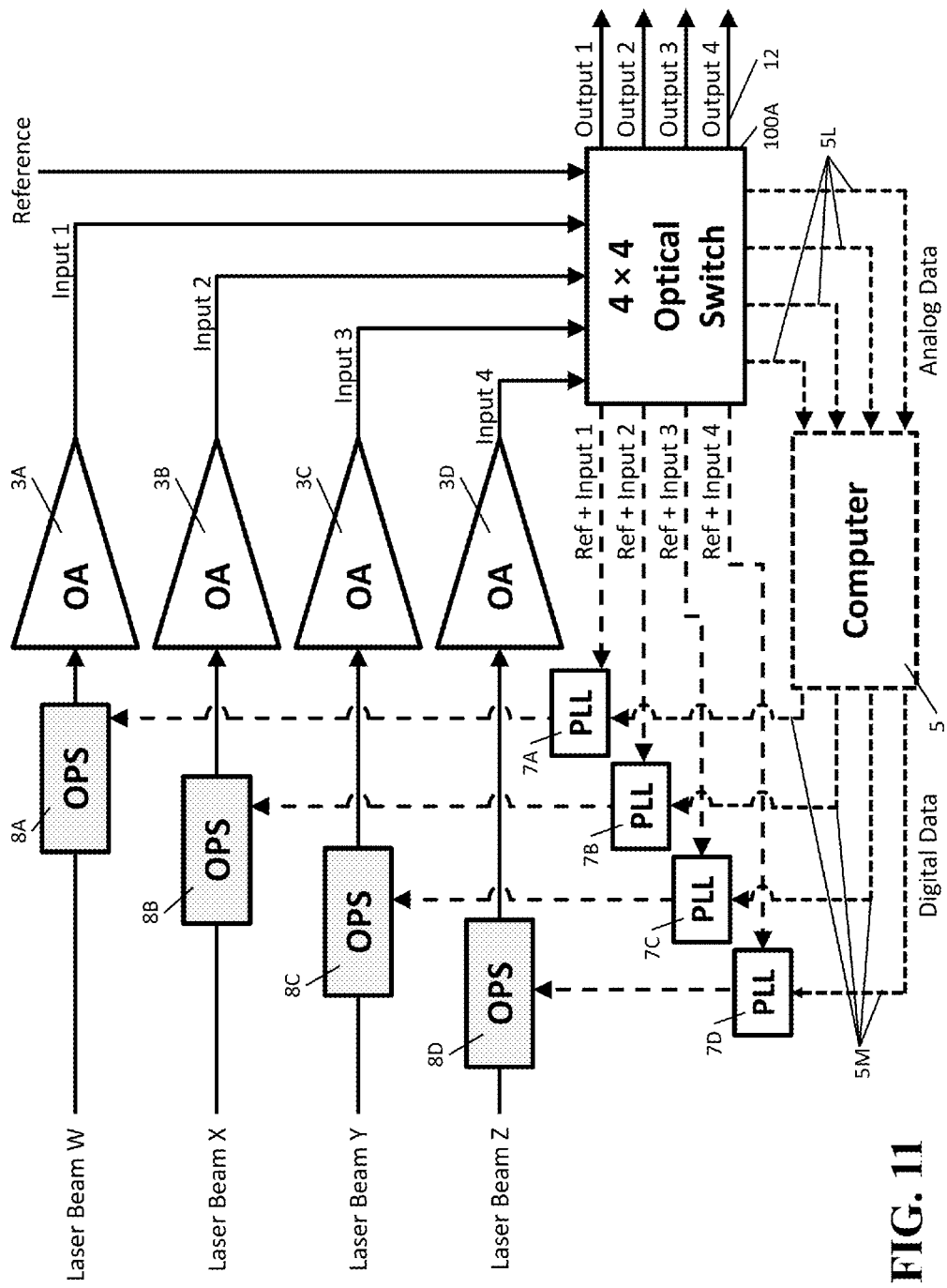
FIG. 11 is a schematic illustration showing a preferred embodiment of a 4×4 optical switch assembly and phase control loops used to monitor and control the relative phase difference between the four input laser beams. Optical beams or fibers are shown with solid lines. Electrical signals or wires are shown with dashed lines.

FIG. 11 is a schematic illustration showing a preferred embodiment 4×4 optical switch assembly and a phase control loop used to monitor and control the relative phase difference between the four input laser beams. The wires and electrical signals are shown with dashed lines. Using precise control over the relative phase difference, four input beams are interferometrically combined into one output beam at one of the output ports 1, 2, 3, or 4. To do this, the optical switch 100A makes use of a feedback loop which causes the phase-locked loop (PLL) circuits 7A-7D to adjust the relative phase difference to maintain coherence between each channel (i.e., the four input laser beams) and a reference beam. There are four phase-locked loop circuits 7A-7D; one for each channel. The phase-locked loop circuits 7A-7D may be, for example, a phase detector or phase comparator that is a frequency mixer, analog multiplier or logic circuit that generates a voltage signal which represents the difference in phase between two signal inputs. The relative phase difference between all channels is maintained by the feedback loops. The phase control loop comprises optical phase shifters (OPS) 8A-D and optical amplifiers (OAs) 3A-3D, which are used to shift the phase of and amplify the inputted beams W, X, Y and Z, respectively. The computer feedback loop is shown in dashed lines comprising computer 5, and series of connecting lines 5L, 5M. The 4×4 Optical Switch 100A comprises input ports from the respective channels for inputs 1-4 and a reference beam input port. Output ports 1 though 4 may be selected individually for outputting the combined laser beam by adjusting the phase of the inputs 1-4 for constructive and/or destructive interference at the various points within the optical switch 100A as shown in FIG. 7 above. Optical switch 100A comprises an additional reference port depicted as port 6 in FIG. 3 and "reference plus input" ports (feedback ports) (depicted in FIG. 3 as ports 13 and 14) shown in FIG. 11 as "Ref.+Input . . . ." Ports. Optical switch 100A comprises Inputs 1 through 4, beamsplitters 101 through 104 (shown in FIG. 7), beamsamplers 111-118 (shown in FIG. 7), photodetectors 121-128 (shown in FIG. 7) that operate in the manner described above in conjunction with the FIGS. 7 through 10.

Beamsamplers 126 (output 1). 127 (output 2), 125 (output 3) and 128 (output 4) sample the output ports and are connected as shown in FIG. 7. The outputs of beamsamplers 125 through 128 are shown by dashed lines in FIG. 11 at the feedback ports of the 4×4 Optical Switch 100A that are connected via lines 5L to a processor or computer 5 which includes a computer program and is connected to the phase-locked loop circuits 7A-7D via lines 5M. The 4×4 optical switch 100A further comprises ports which output on four separate lines the reference plus the input 1, the reference plus the input 2, the reference plus the input 3, and the reference plus the input 4. These outputs are inputted into the phase-locked loop circuits (PLL) 7A-7D to maintain coherence between each channel (i.e., the four input laser beams) and a reference beam. The phase-locked loop circuits 7A-7D are connected to each of the optical phase shifters 8A-8D to maintain coherence.

As used herein, the terminology phase-locked loop or phase lock loop (PLL) refers to a control system, subsystem, or circuit that outputs a signal having a phase related to the phase of the inputted signal. The circuit may comprise a variable frequency oscillator, which generates a periodic signal, and a phase detector that compares the phases of the signal with the phase of the input periodic signal, and adjusts the oscillator to match the phases. A feedback loop may be formed by returning the output signal back to the input signal for comparison.

Obviously, many modifications and variations of the present invention are possible in light of the above teachings. It is therefore to be understood that, within the scope of the appended claims, the invention many be practiced otherwise than as specifically described.

What is claimed is:

1. A beam combining device comprising:
at least one beam splitter comprising a semi-reflective surface, first and second inputs, and first and second outputs; the at least one beam splitter operatively connected to receive first and second light beams at the first and second inputs, respectively; the semi-reflective surface having first and second sides positioned such that light entering the first input and illuminating the first side may be reflected through the first output and/or transmitted through the second output; and light entering the second input illuminating the second side may be transmitted through the first output and/or reflected through the second output;
phase adjustment circuitry for adjusting the relative phases of the first and second light beams; the phases being adjustable such that when light transmitted through the semi reflective surface from the first input has a phase which cancels light reflected from the semi reflective surface from the second input, and light reflected from the semi-reflective surface from first input constructively adds to the light transmitted through the semi-reflective surface from the second input, then light having the combined power of the first and second light beams is emitted through the first output; and when light transmitted through the semi-reflective surface from the first input has a phase which constructively adds to light reflected from the semi-reflective surface from the second input, and light reflected from the semi-reflective surface from first input destructively interferes with the light transmitted through the semi-reflective surface from the second input, then light having the combined power of the first and second light beams is emitted through the second output;
whereby depending upon the adjustment of phases of the first and second light beams, the power of the light outputted from either the first or second outputs may be controlled.

2. The device of claim 1 wherein the first or second output can be selected by varying the phase differential between the first and second light beams without mechanical input, and wherein the power of light outputted from the first output is the summation of the power of the first and second light beams and the power of light outputted from the other of the first or second outputs is substantially zero.

3. The device of claim 1 further comprising a plurality of light detectors operatively connected to each output of the at least one beam splitter to measure the power of the light from each of the outputs of the at least one beam splitter.

4. The device of claim 1 wherein the phase adjustment circuitry for adjusting the relative phases of the first and second light beams operates to vary the intensity of light emitted from the first and second outputs from substantially no light to the summation of the power of the inputted light beams.

5. The device of claim 1 further comprising a plurality of photodetectors and feedback circuitry operatively connected to the phase adjustment circuitry, and wherein the at least one beam splitter comprises a plurality of beam splitters, each of the plurality of photodetectors being operatively connected to an output of another of the plurality of beam splitters and the feedback circuitry, such that the measurement detected by the plurality of photodetectors is used to control the phase of the first and second laser beams.

6. The device of claim 1 wherein the at least one beam splitter comprises first, second, third and fourth beam splitters, each having first and second inputs, a semi-reflective surface and first and second outputs;
the first and second inputs of the first and second beam splitters operative to receive four inputted light beams;
the first and second outputs of the first and second beam splitters being operatively connected to the first and second inputs of third and fourth beamsplitters, respectively;
the first and second outputs of the third and fourth beamsplitters selectively outputting a laser beam; the selection being determined by varying the phase of the four inputted light beams;
whereby, by varying the phase of the four inputted light beams, an output beam can be selectively emitted from one of the outputs of the third and fourth beamsplitters which has the combined power of the at least four inputted beams.

7. The device of claim 6 further comprising four photodetectors, each photodetector being operatively associated with one of the first and second outputs of the third and fourth beamsplitters, each photodetector being operative to measure the power of the light emitted from the associated output.

8. The device of claim 6 further comprising eight photodetectors; each photodetector being operatively associated with each of the outputs of the first, second, third and fourth beamsplitters, each photodetector being operative to measure the power of the light output from the respective output of the first, second, third and fourth beamsplitters.

9. The device of claim 1 further comprising a plurality of beam samplers operatively associated with the first and second outputs and a plurality of photodetectors, each photodetector being operatively associated with a beam sampler and operatively connected to the phase adjustment circuitry, wherein the phase adjustment circuitry for adjusting the relative phases of the first and second light beams receives inputs from the plurality of photo detectors.

10. The device of claim 1 further comprising a reference beam input operatively associated with an input of one of the at least one beam splitters, and a plurality of photodetectors operatively associated with the outputs of the at least one beam splitter, wherein the phase adjustment circuitry further comprises a computer and a plurality of phase lock loop circuits, each of the phase lock loop circuits and the computer receiving the output of one of the plurality of photodetectors and operating to adjust the phases of the first and second light beams relative to the reference light beam.

11. A beam combining device comprising:
first, second, third and fourth beam splitters, each comprising a semi-reflective surface; first and second inputs, and first and second outputs; each beam splitter is configured to receive light at the first and second inputs; the semi-reflective surface having first and second sides positioned such that light entering the first input and illuminating the first side may be reflected to the first output and/or transmitted to the second output; and light entering the second input illuminating the second side may be transmitted to the first output and/or reflected to the second output;
phase adjustment circuitry for adjusting the relative phases of the light entering the plurality of beam splitters; the phases being adjustable such that for each beam splitter, when light transmitted through the semi reflective surface from the first input has a phase which cancels light reflected from the semi reflective surface from the second input, and light reflected from the semi-reflective surface from first input constructively adds to the light transmitted through the semi-reflective surface from the second input, then light having the combined power of the first and second light beams is emitted through the first output; and when light transmitted through the semi-reflective surface from the first input has a phase which constructively adds to light reflected from the semi-reflective surface from the second input, and light reflected from the semi-reflective surface from first input destructively interferes with the light transmitted through the semi-reflective surface from the second input, then light having the combined power of the first and second light beams is emitted through the second output;
the beam splitters being arranged such that the first and second beam splitters have inputs for first, second, third and fourth light beams, one output of each of the first and second beam splitters being operatively connected to the first and second inputs of a third beam splitter, the other output of each of the first and second beam splitters being operatively connected to the first and second inputs of a fourth beam splitter; the third and fourth beam splitters each having first and second outputs which can selectively output a light beam having the cumulative power of the first, second, third and fourth light beams by varying the phase difference between the light beams.

12. The device of claim 11 wherein the phase adjustment circuitry for adjusting the relative phases of the light beams operates to vary the intensity of light emitted from the outputs from substantially no light to the summation of the power of the inputted light beams.

13. The device of claim 11 further comprising a plurality of photodetectors and feedback circuitry operatively connected to the phase adjustment circuitry, each of the plurality of photodetectors being operatively connected to an output of the four beam splitters and the feedback circuitry, such that the measurements of the plurality of photodetectors are used to measure the phase of the inputted light beams.

14. The device of claim 13 further comprising a computer and wherein the feedback circuitry is operatively connected to the computer, and wherein the voltages measured by the plurality of photodetectors are inputted into the computer and the operator may select which of the outputs will output a laser beam.

15. The device of claim 11 further comprising four photodetectors, each photodetector being operatively associated with one of the first and second outputs of the third and fourth beamsplitters, each photodetector being operative to measure the power of the light emitted from the associated output.

16. The device of claim 11 further comprising eight photodetectors; each photodetector being operatively associated with each of the outputs of the first, second, third and fourth beamsplitters, each photodetector being operative to measure the power of the light output from the respective output of the beamsplitters.

17. The device of claim 11 further comprising a plurality of beam samplers operatively associated with the first and second outputs and a plurality of photodetectors, each photodetector being operatively associated with a beam sampler and operatively connected to the phase adjustment circuitry, wherein the phase adjustment circuitry for adjusting the relative phases of the first and second light beams receives inputs from the plurality of photodetectors.

18. A method for combining laser light beams comprising; inputting at least four laser light beams into first and second beam splitters; each of the first and second beam splitters having first and second inputs and first and second outputs; operatively connecting first and second outputs of the first and second beam splitters to first and second inputs of third and fourth beamsplitters, respectively; the third and fourth beam splitters each have two outputs; providing phase adjustment circuitry for varying the relative phase of each of the four laser beams; and by varying the phase of the at least four laser light beams, selectively emitting an output beam from one of four outputs of the third and fourth beam splitters which has the combined power of the at least four inputted beams.

19. The method of claim 18 wherein the phase adjustment circuitry comprises a computer and wherein the phase is controlled by operation of the computer.

20. The method of claim 19 wherein each of the outputs of the first, second, third and fourth beam splitters are operatively connected to a photodetector, and the photodetectors provide measurements of the power outputted by the beam splitters to the phase adjustment circuitry.

* * * * *